US006543937B1

(12) United States Patent
Onnela

(10) Patent No.: US 6,543,937 B1
(45) Date of Patent: Apr. 8, 2003

(54) AXIAL FITTING WITH SLIDING BEARINGS OF THE ROLL MANTLE OF A ROLL OF A PAPER/BOARD OR FINISHING/CONVERTING MACHINE

(75) Inventor: Jori Onnela, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 23 days.

(21) Appl. No.: 09/759,059

(22) Filed: Jan. 12, 2001

(30) Foreign Application Priority Data

Jan. 14, 2000 (FI) ......................................... 20000017 U

(51) Int. Cl.[7] .......................... F16C 17/04; F16C 32/06; B30B 3/00
(52) U.S. Cl. ......................................... 384/121; 492/20
(58) Field of Search ................................. 384/121, 122, 384/124, 420, 424; 492/5, 7, 20

(56) References Cited

U.S. PATENT DOCUMENTS 4,915,510 A * 4/1990 Arvidsson ................... 384/121
5,419,242 A * 5/1995 van Haag ....................... 492/7
5,566,451 A * 10/1996 Niskanen et al. ............... 492/7
6,004,249 A * 12/1999 Blais ............................ 492/20

* cited by examiner

Primary Examiner—Thomas R. Hannon
(74) Attorney, Agent, or Firm—Steinberg & Raskin, P.C.

(57) ABSTRACT

A sliding bearing axial fitting of a roll mantle of a roll in a paper or board machine for preventing a relative axial movement of the roll mantle with respect to a stationary roll axial, the roll mantle being fitted with a bearing to permit revolution of the roll mantle about the stationary roll axle. The sliding bearing axial fitting includes a ring portion attached to the roll mantle, a backing ring attached to the stationary roll axle, a first set of hydrostatic axial sliding bearing members arranged between a first side of the ring portion and a shoulder of the roll, and a second set of hydrostatic axial sliding bearing members arranged between a second side of the ring portion and the backing ring.

12 Claims, 3 Drawing Sheets

AXIAL FITTING WITH SLIDING BEARINGS OF THE ROLL MANTLE OF A ROLL OF A PAPER/BOARD OR FINISHING/CONVERTING MACHINE

FIELD OF THE INVENTION

The present invention relates to an axial fitting with sliding bearings of a roll mantle of a roll of a paper/board or finishing/converting machine, said roll mantle being fitted with bearings to revolve around a stationary roll axle.

OBJECTS AND SUMMARY OF THE INVENTION

The aim of the present invention is to provide a relatively simple axial fitting with sliding bearings of a roll mantle arranged to revolve around a stationary roll axle, which fitting with bearings is applicable to different types of rolls, such as, for example, variable crown rolls, thermorolls, tube rolls, suction rolls, and reeler rolls, in which radial fitting with bearings can be implemented by fitting with sliding bearings or by means of roller bearings. The rolls may, in addition, be either provided with drive means or without drive means.

To achieve the aim of the invention, the axial fitting with sliding bearings relating to the invention is characterised in that the axial fitting with sliding bearings comprises a radially inwards extending ring portion arranged in the mantle, on both sides of which ring portion, in the axial direction of the mantle, are arranged hydrostatic axial sliding bearing elements, which are provided with control valve means which are controlled by the movement of the ring portion arranged in the mantle and following the axial movement of the mantle, wherein the axial sliding bearing elements on at least one side of the ring portion are located on the backing ring attached to the axle.

If necessary, the control valve means can be replaced with hydraulic constant-flow feed.

BRIEF DESCRIPTION OF THE DRAWINGS

The invention is described in greater detail in the following, with reference to the appended drawings, in which.

DETAILED DESCRIPTION OF THE INVENTION

Figure 2:
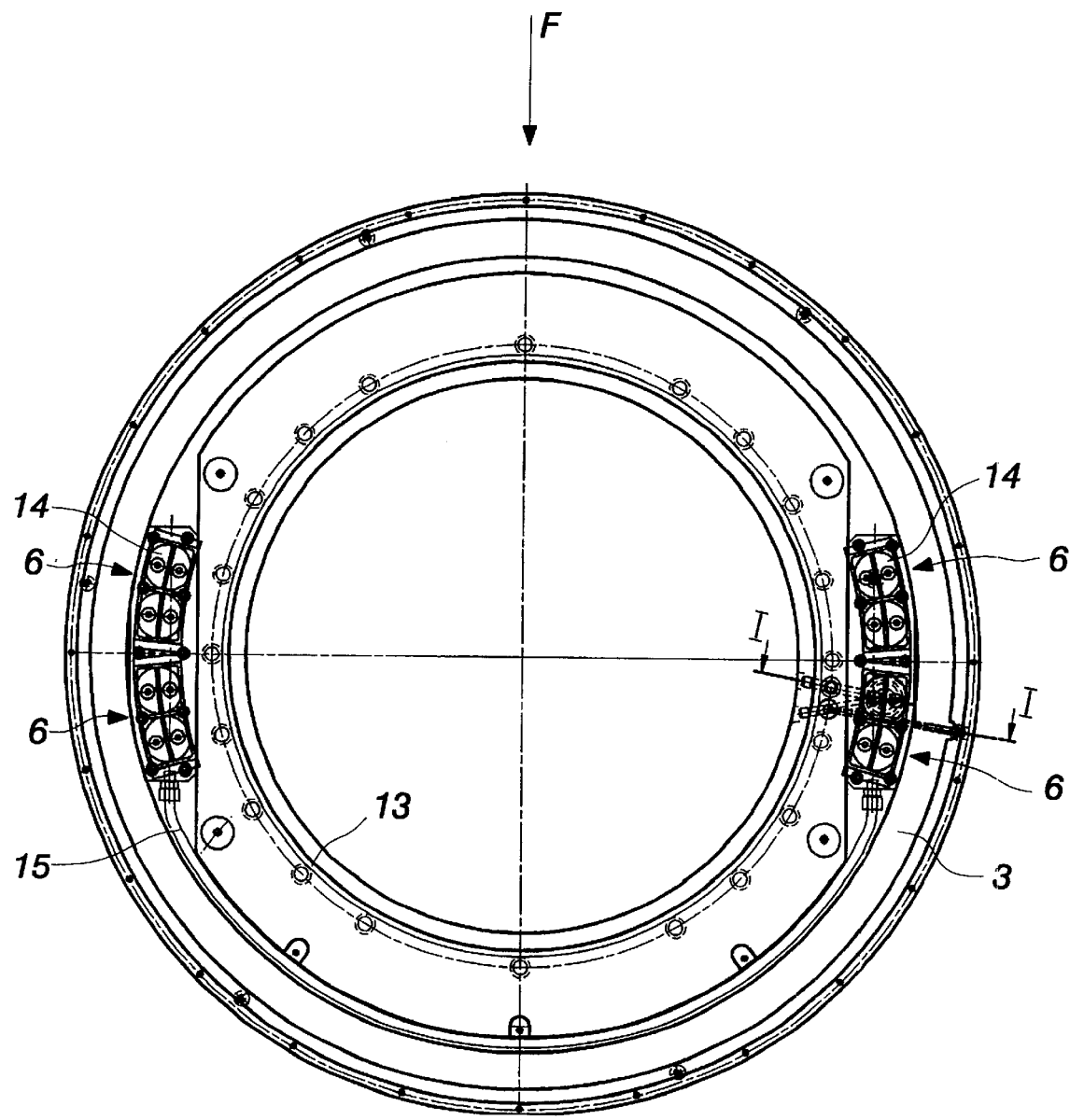
FIG. 2 is a plan view of a backing ring used in the axial fitting with sliding bearings relating to the present invention, as seen from the side of the sliding bearing elements.
Figure 3:
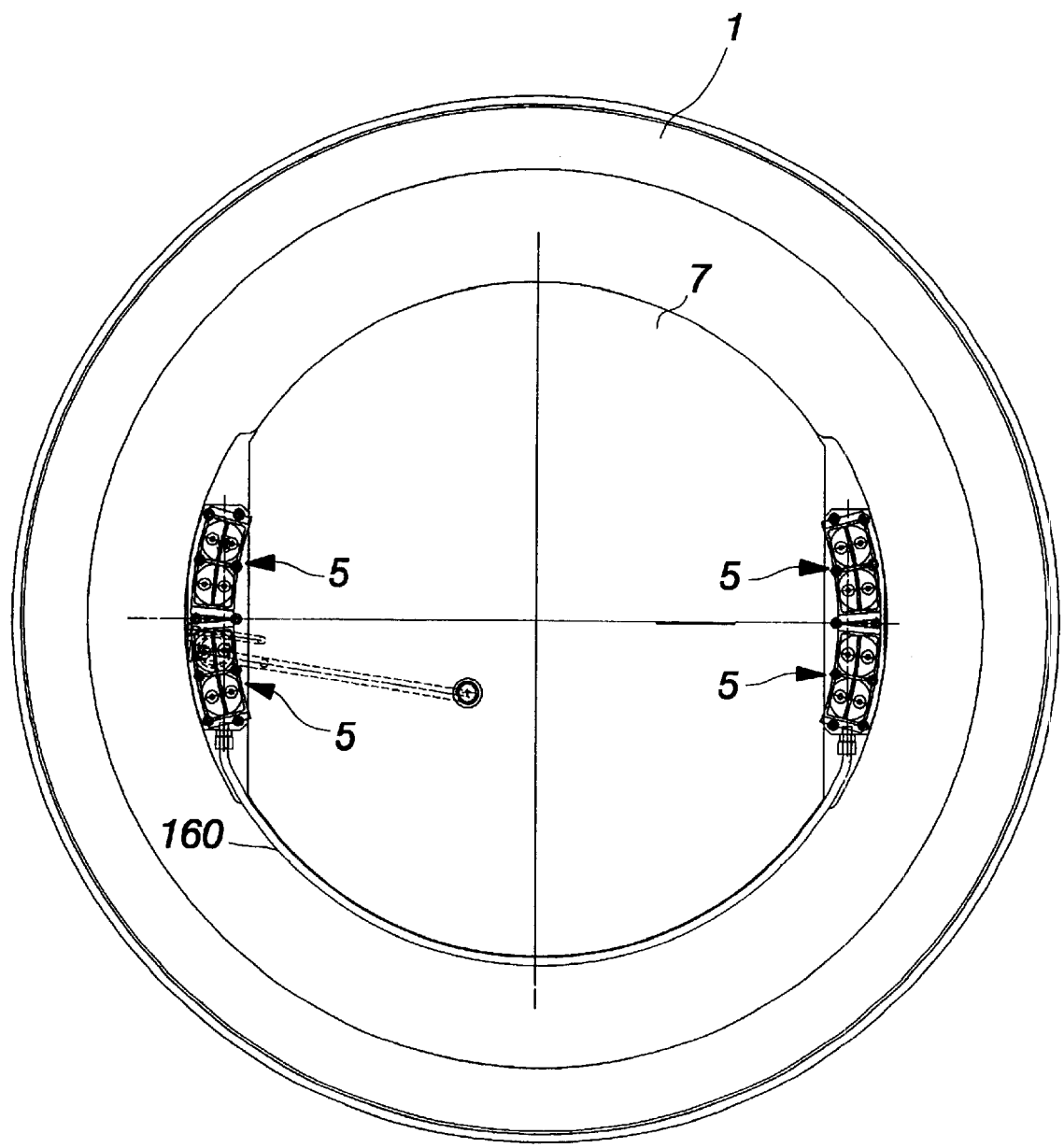
FIG. 3 is a plan view showing the location of the sliding bearing elements on the roll axle as seen from the end of the axle.

In accordance with the figures, the axial fitting with sliding bearings relating to the invention comprises a ring portion 2 attached to the roll mantle 1, the ring portion extending radially inwards from the mantle 1. In the embodiment shown, the ring portion 2 is formed as the end ring of the roll mantle 1, but it is also conceivable to locate it elsewhere inside the roll mantle, however, preferably in the area of the radial fitting with bearings of the roll mantle. On both sides of the ring portion 2 are arranged axial sliding bearing elements 5, 6, of which the inner sliding bearing elements 5 on the side of the roll axle 7 are attached directly onto the axle 7 in the embodiment shown, and the outer sliding bearing elements 6 on the opposite side of the ring portion 2, in the axial direction of the mantle, are, on the other hand, attached to a separate backing ring 3, which is attached, for example, by means of a bolted joint to the roll axle 7. The sliding bearing elements 5, 6 comprise piston parts 18 and 14, respectively, which can be loaded with hydraulic fluid, the piston parts being provided with sliding surfaces resting against the ring portion 2, and which piston parts move in the respective bores of the backing ring and the axle. In conjunction with the piston parts 14 of the sliding bearing elements 6 is arranged a control valve 4, to which the feed pressure is supplied through a pipe or a bore 8 from the roll axle 7. The feed pressure can also be supplied directly from outside to the backing ring, if it is not desirable to bring it via the axle. The control valve 4 directs the pressure of the hydraulic fluid to the different sides of the ring portion 2, whereby the pressure coming to the axle-side bearing element 5 is conducted along a pipe or bore 9. In the embodiment shown, in accordance with FIG. 2, the backing ring 3 has four sliding bearing elements 6 each time, of which two elements are located next to each other on one side with respect to the central axis of the axle 7, and the other two next to each other on the opposite side of the said central axis. The sliding bearing elements 5 on the axle 7 are located in a corresponding manner in alignment with the sliding bearing elements 6 on the backing ring 3 on the other side of the ring portion 2. The segments on the different sides of the centre line are connected to each other by means of a pipe or bores 15 or 160, respectively. In the embodiment shown, the sliding bearing elements 5, 6 are located on an essentially vertical plane with respect to the direction of action of the nip load F (see FIG. 3), i.e. perpendicular to the direction of of action of the nip load F. It is also conceivable to locate the sliding bearing elements, for example, in the direction of loading F of the nip, but in such a case the elements 5, 6 must have more play due to the deflection of the roll axle 7 than on the plane which is vertical with respect to the direction of loading. There may obviously be more than the shown four sliding bearing elements in the backing ring 3, and correspondingly on the axle 7, and there may also be fewer of them depending, among other things, on the axial bearing forces required.

In operation the sliding bearing axial fitting, according to the present invention, prevents a relative axial movement of the roll mantle (1) with respect to the stationary roll axle (7). The ring portion (2) is coupled to the roll mantle (1) so as to extend radially inward from a surface of the roll mantle (1) and the backing ring (3) is attached to the stationary roll axle (7) so as to extend radially outward from the stationary roll axle (7) such that the ring portion (2) and the backing ring (3) overlap one another. The first set of hydrostatic axial sliding bearing elements (5) are operatively coupled between a first side of the ring portion (2) and a shoulder of the roll axle (7) and the second set of hydrostatic axial sliding bearing elements (6) are operatively coupled between a second side of the ring portion (2) and the backing ring (3). The first and second set of hydrostatic axial sliding bearing elements (5 and 6) are each provided with control valve means (4), the control valve means (4) being controlled by the relative axial movement of the roll mantle (1) on the stationary roll axle (7). During operation of the paper machine, the ring portion (2) and the sliding bearings (5) and (6) cooperate to prevent unwanted axial movement of the roll mantle.

Figure 1:
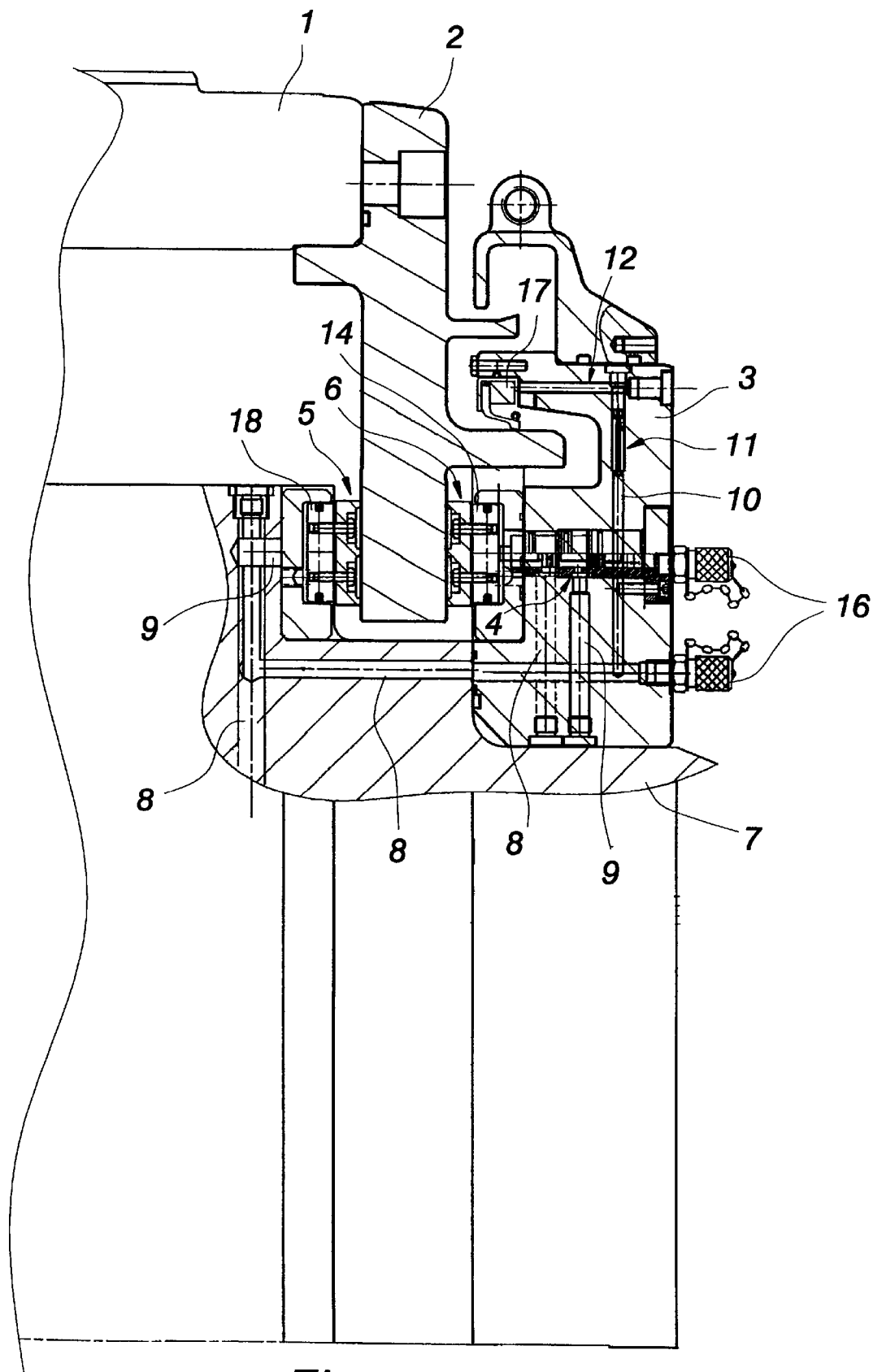
FIG. 1 is a diagrammatic sectional side view of the axial fitting with bearings relating to the present invention.

FIG. 1 further shows a gasket 17 to which is supplied lubricating oil through a bore or a pipe 12 which is connected to the bore or pipe 8 of the feed pressure line of the control valve 4 of the axial fitting with bearings by means of a pipe or bore 10 in which is arranged a throttle part 11, for example, a capillary tube, in order to achieve the desired reduced lubricating oil feed pressure.

In FIG. 1, reference numeral 16 denotes measuring nips through which the pressures of axial fitting with sliding bearings can be monitored on different sides of the ring portion 2.

The present invention has been described herein with reference to preferred embodiments of the invention however the description provided herein is for illustrative purposes and should not be considered to be exhaustive. It is understood that modifications and variations of the above describe preferred embodiments are possible without departing from the spirit or scope of the present invention.

What is claimed is:

1. Axial fitting with sliding bearings of the roll mantle (1) of a roll of a paper/board or finishing/converting machine, the said roll mantle being fitted with bearings to revolve around a stationary roll axle (7), wherein the axial fitting with sliding bearings comprises a radially inwards extending ring portion (2) arranged in the mantle (1), on both sides of which ring portion, in the axial direction of the mantle (1), are arranged hydrostatic axial sliding bearing elements (5, 6), which are provided with control valve means (4) which are controlled by the movement of the ring portion (2) arranged in the mantle (1) and following the axial movement of the mantle, wherein the axial sliding bearing elements (6) on at least one side of the ring portion (2) are located on the backing ring (3) attached to the axle (7).

2. Axial fitting with bearings as claimed in claim 1, wherein the ring portion (2) is located in the bearing area of the mantle (1).

3. Axial fitting with bearings as claimed in claim 1 wherein the roll is a variable crown roll, in which the mantle (1) is supported by means of hydrostatic support elements on the roll axle (7).

4. Axial fitting with bearings as claimed in claim 1, wherein the ring portion (2) is arranged to revolve with the mantle (1).

5. Axial fitting with bearings as claimed in claim 1 wherein the axial sliding bearing elements (5, 6) on opposite sides of the ring portion (2) have one common control valve.

6. Axial fitting with bearings as claimed in claim 1 the roll is a nip roll, that the axial sliding bearing elements are located on opposite sides with respect to the central axis of the roll, on a plane which is essentially vertical with respect to the direction of action of the nip load (F).

7. A sliding bearing axial fitting of a roll mantle (1) of a roll of a paper/board or finishing/converting machine for preventing a relative axial movement of said roll mantle (1) with respect to a stationary roll axle (7), wherein said roll mantle (1) is fitted with bearing to permit revolution of said roll mantle around said stationary roll axle (7), wherein said sliding bearing axial fitting, comprises:

a ring portion (2) coupled to said roll mantle (1) and structured and arranged to extend radially inward from said roll mantle (1);

a backing ring (3) attached to said stationary roll axle (7) and structured and arranged to extend radially outward from said stationary roll axle (7) and to overlap said ring portion (2);

a first set of hydrostatic axial sliding bearing members (5) operatively coupled between a first side of said ring portion (2) and a shoulder of said roll axle (7);

a second set of hydrostatic axial sliding bearing members (6) operatively coupled between a second side of said ring portion (2) and said backing ring (3); and wherein each of said first and second set of hydrostatic axial sliding bearing members (5 and 6) are provided with control valve means (4), said control valve means (4) being controlled by said relative axial movement of said roll mantle (1) on said stationary roll axle (7); whereby when said roll mantle (1) moves axially toward said first set of bearing members (5) said control valve means of said first set of bearing members is actuated thereby forcing said roll mantle (7) in a direction opposite to said axial movement and when said roll mantle (1) moves axially toward said second set of bearing members (6) said control valve means of said second set of bearing members is actuated thereby forcing said roll mantle (7) in a direction opposite to said axial movement, whereby said roll mantle (7) is maintained centrally located over said stationary roll axle (7).

8. The sliding bearing axle fitting according to claim 7, wherein said ring portion (2) is structured and arranged within an area of bearing of said mantle.

9. The sliding bearing axle fitting according to claim 7, wherein said roll is a variable crown roll and wherein said roll mantle (1) of said variable crown roll is supported by hydrostatic support elements structured and arranged on said stationary roll axle (7).

10. The sliding bearing axle fitting according to claim 7, wherein said ring portion (2) is structured and arranged to revolve with said roll mantle (1).

11. The sliding bearing axle fitting according to claim 7, wherein said first and second axial sliding bearing member share a common control valve.

12. The sliding bearing axle fitting according to claim 7, wherein said roll is a nip roll structured and arranged for receiving a nip load thereon, and wherein said first and second axial sliding bearing members are structured and arranged on opposing sides of a central axis of said roll and wherein said first and second axial sliding bearing members act on a plane substantially perpendicular to said nip load.

* * * * *